(12) United States Patent
Calcote et al.

(10) Patent No.: US 6,419,292 B1
(45) Date of Patent: Jul. 16, 2002

(54) TRUCK BED CONVERSION

(76) Inventors: Bill G. Calcote; Michael P. Calcote, both of P.O. Box 472, Winters, TX (US) 79567

( * ) Notice: Subject to any disclaimer, the term of this patent is extended or adjusted under 35 U.S.C. 154(b) by 0 days.

(21) Appl. No.: 09/593,832

(22) Filed: Jun. 13, 2000

Related U.S. Application Data

(60) Provisional application No. 60/139,937, filed on Jun. 18, 1999.

(51) Int. Cl.$^7$ .................................................. B60P 1/64
(52) U.S. Cl. ...................... 296/35.3; 414/500; 414/494
(58) Field of Search .................. 296/183, 184, 296/37.6, 167, 136, 35.3; 414/334, 336, 559, 538, 539, 540, 491, 494, 500, 498; 220/562, 1.5, 671; 298/17 R

(56) References Cited

U.S. PATENT DOCUMENTS

| | | |
|---|---|---|
| 877,750 A | 1/1908 | Windham |
| 1,279,609 A | 2/1918 | Taketoshi |
| 1,293,664 A | 2/1919 | Avery |
| 1,615,532 A | 1/1927 | Baxter |
| 1,784,975 A | 12/1930 | Roseman |
| 2,151,640 A | 3/1939 | Menning |
| 2,264,216 A | * 11/1941 | Milligan ...................... 414/491 |
| 3,895,842 A | * 7/1975 | Fair ............................ 296/184 |
| 4,269,443 A | 5/1981 | Farmer |
| 4,662,670 A | 5/1987 | Kenner |
| 4,702,510 A | 10/1987 | Davis |
| 4,969,690 A | 11/1990 | Smith |
| 5,192,189 A | * 3/1993 | Murata et al. .......... 296/184 X |
| 5,671,855 A | * 9/1997 | Norman, Jr. et al. ... 220/671 X |
| 5,806,863 A | * 9/1998 | Heger et al. ............. 220/1.5 X |
| 5,848,869 A | * 12/1998 | Slocum et al. .............. 414/500 |
| 5,934,860 A | * 8/1999 | Hotte ......................... 414/500 |

FOREIGN PATENT DOCUMENTS

| | | | | |
|---|---|---|---|---|
| GB | 2031387 A | * | 4/1980 | ................. 296/35.3 |
| GB | 2035915 A | * | 6/1980 | ................. 296/35.3 |
| GB | 2220171 A | * | 1/1990 | ................. 296/35.3 |

* cited by examiner

*Primary Examiner*—Stephen T. Gordon
*Assistant Examiner*—Jason Morrow
(74) *Attorney, Agent, or Firm*—Wendell Coffee

(57) ABSTRACT

A method of and structure for quickly changing beds upon a truck frame by pivoting tracks to the rear of the truck frame. The front of empty tracks are raised. A bed with the front propped up is pulled upon the tilted rails. The front is secured from moving upward. Skirts on the rails prevent side ways movement by the bed which is pinned to the rails at the rear. To remove the bed, the front of the rails are raised to permit the bed to slid down onto props at front.

5 Claims, 3 Drawing Sheets

TRUCK BED CONVERSION

CROSS REFERENCE TO RELATED APPLICATION

Provisional Patent Application

Applicants claims the benefit of their U.S. Provisional Application No. 60/139,937, filed Jun. 18, 1999.

BACKGROUND OF THE INVENTION (1) Field of the Invention

This application relates to trucks and more particularly to changing the beds upon the trucks so that a single truck can carry a different bed such as a dump bed, a liquid tank bed, a box bed, a van bed, or a cattle bed. In addition the truck can be converted to a tractor with the attachment of a fifth wheel bed.

(2) Description of the Related Art

Before this invention was made, patents such as Avery, U.S. Pat. No. 1,293,664 and Rosman, U.S. Pat. No. 1,784,975 described moving a bed onto a truck frame by having the bed stored upon a dock or platform having approximately the same height as the truck frame.

Smith U.S. Pat. No. 4,769,690 discloses a fifth wheel tractor with a conversion for placing a bed onto the fifth wheel.

Also it has been known that an automobile frame could have bodies placed upon them so that they functioned as a passenger carrying automobile or a truck. Examples of this are Windham U.S. Pat. No. 877,750 or Taketoshi U.S. Pat. No. 1,279,609.

SUMMARY OF THE INVENTION (1) Progressive Contribution to the Art

This invention provides a rapid transfer of multiple beds upon a single truck frame. No special platforms or docks are necessary for storing the beds when they are not attached to the truck. In this invention the bed is stored with the front end propped up by legs or props which are attached under the front area of the bed. Then, the front of the bed is at or above a truck frame height. Therefore the truck can be positioned in front of the bed and then the bed pulled onto rails which have been raised upward so that the bed is supported by the rails as it is pulled onto the rails. After the bed is substantially on the rails, then the rails are lowered.

In one embodiment of the invention the truck is manufactured to be used as a dump truck. Then the existing hydraulic cylinder is used to tilt the rails to the proper angels.

For trucks whose original utility was not as a dump truck can readily be outfitted by adding either a hydraulic cylinder at the front of the frame immediately behind the cab or by installing a scissor type lift to raise the rails.

(2) Objects of this Invention

An object of this invention is to convert a truck frame to carry different type beds.

Another object is to convert beds so that each bed may be attached to a converted truck frame.

Further objects are to achieve the above with elements that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

Further objects are to achieve the above with a product that is easy to store, has a long storage life, is safe, versatile, efficient, stable and reliable, yet is inexpensive and easy to manufacture and utilize.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 3 is a perspective view of rail and housing with one skirt removed.

Catalogue of Elements

As an aid to correlating the terms to the exemplary drawing(s), the following catalog of elements is provided:

| | |
|---|---|
| 10 | cab |
| 12 | wheels |
| 14 | frame |
| 16 | pivot pins |
| 18 | bracket |
| 20 | rails |
| 22 | rear |
| 24 | front |
| 25 | bed |
| 26 | housing |
| 28 | tower |
| 29 | connect |
| 30 | leg panels |
| 31 | nose plug |
| 32 | cylinder |
| 33 | plate |
| 34 | cavity |
| 35 | winch |
| 36 | rod |
| 37 | cable |
| 38 | skirt |
| 39 | slide plates |
| 40 | channel |
| 42 | web |
| 44 | channel flange |
| 46 | ledge |
| 47 | triangle |
| 48 | hole for pin |
| 52 | front bottom cover |

-continued

| 54 | top |
| 56 | prop |
| 58 | tube |
| 60 | rollers |
| 62 | horizontal tube |
| 64 | horizontal element |
| 66 | downward prop |
| 68 | cylinder |
| 70 | trunnions |
| 72 | brackets |
| 74 | low housing |
| 76 | upper link |
| 78 | lower link |
| 80 | pivot |
| 82 | rod |
| 84 | hydraulic cylinder |
| 86 | fifth wheel |
| 88 | fifth wheel bed |
| 90 | prop |
| 92 | rollers |
| 94 | fenders or mud guard |
| 96 | fifth wheel receptacle |

DESCRIPTION OF THE PREFERRED EMBODIMENT

Figure 1:
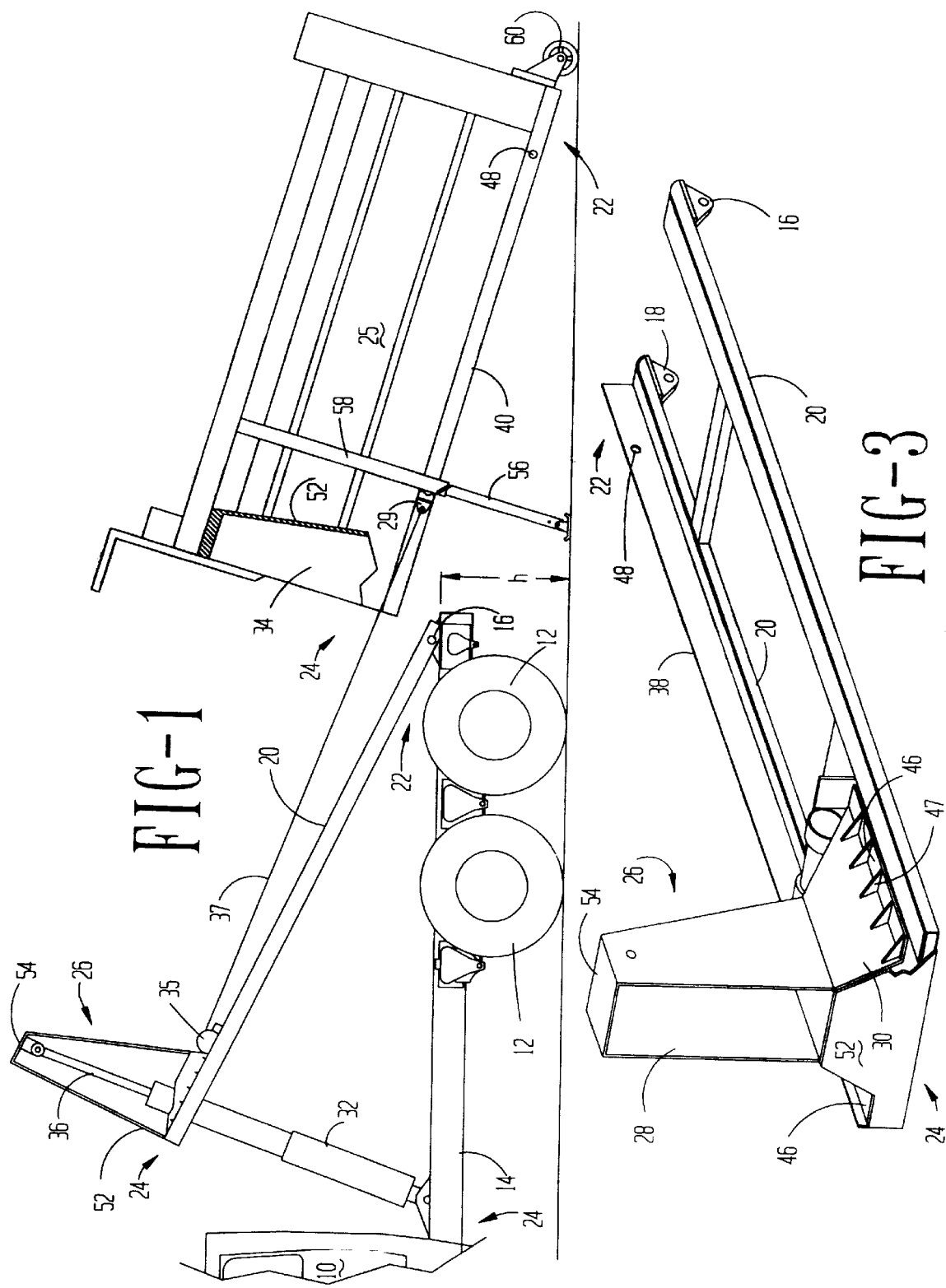
FIG. 1 is a side elevational view with some elements broken away of a truck according to this invention shown with the frame tilted and a cable extending to a bed to began pulling the bed onto rails.

Referring to the attached drawing, particularly FIG. 1, it may be seen a truck having a cab 10, rear wheels 12, and frame 14. At the rear of the frame is a pivot pin 16 FIG. 3. The frame will have a frame height "h".

Each of the pins 16 extend through brackets 18 which depend from rails 20. (FIG. 3) The rails 20 extend the length of the frame from the rear end 22 to the front 24 adjacent to the cab 10. A housing 26 (a side removed to show cylinder 32) is attached to the front of the rails 20.

Figures 2, 4, 5:
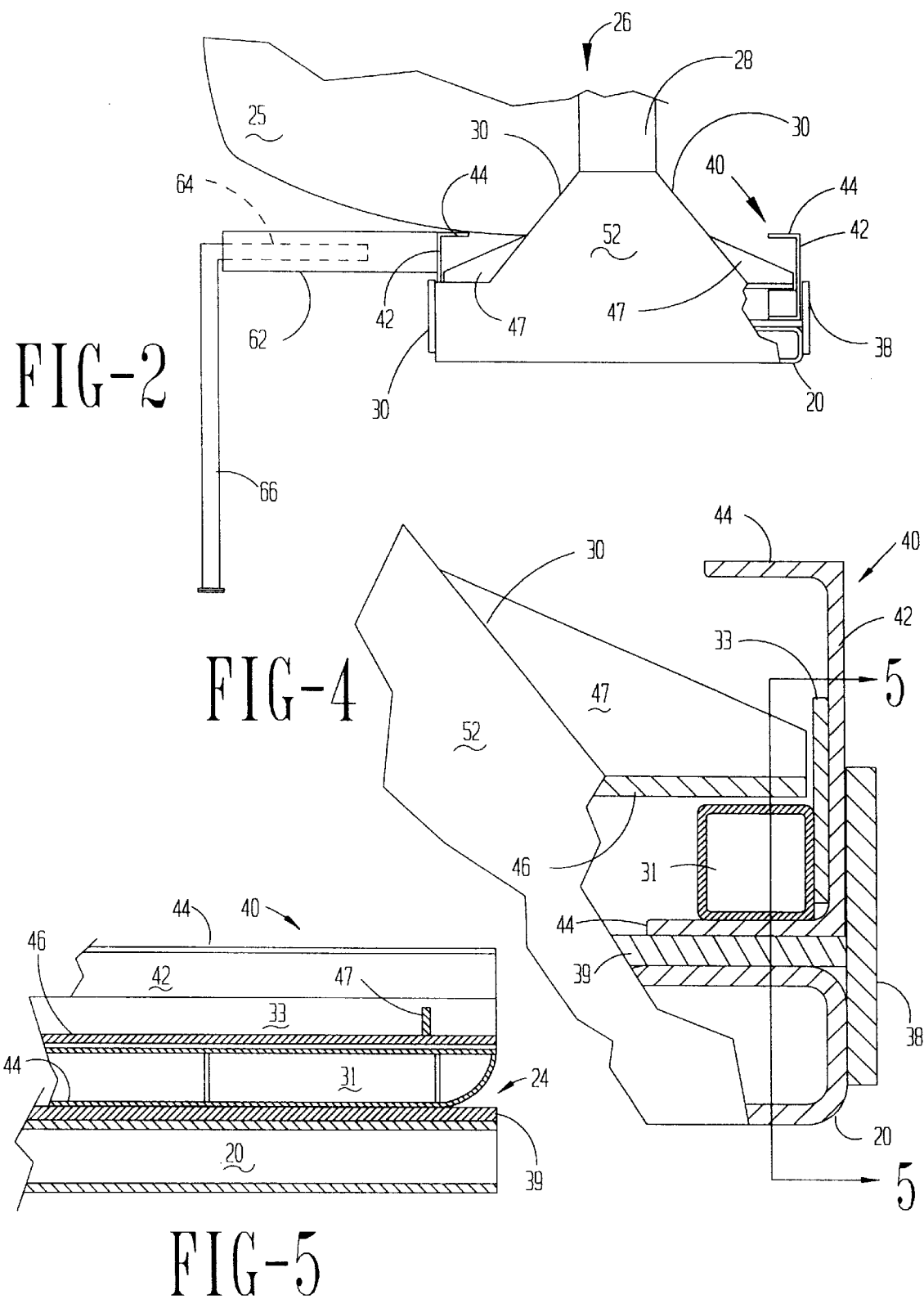
FIG. 2 is a front elevational view of a tank bed on the rails with one prop in place and parts broken away.
FIG. 4 is an enlarged sectional view of the front of one of the rails, channel and ledge.
FIG. 5 is a sectional view taken on line 5—5 of FIG. 4.
Figure 6:
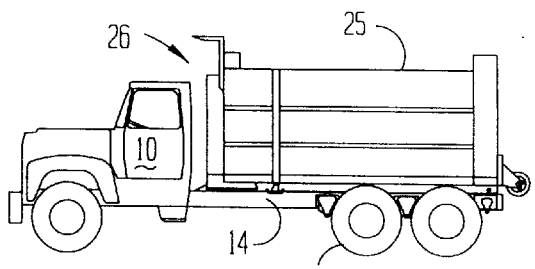
FIG. 6 is a side elevational view of a dump bed on a truck according to this invention.

FIG. 2 and 3 show housing 26 on the rails 20. Housing 26 has a main tower 28 which is securely fixed to the rails by leg panels 30.

Referring to FIG. 1, the tower houses a hydraulic cylinder 32 which is anchored to frame 14.

Also referring to FIG. 2 the housing 26 with its tower 28 and leg panels 30 conform to a standard dump bed in that the dump bed has a cavity 34 in its forward section which mates around the housing 26.

Bed 25 (a dump bed) to be lifted by housing 26 has a cavity 34 to contain the housing 26. Therefore, the cylinder 32 and cylinder rod 36 fits within the housing to raise the tracks 20 in the same mode as it would to raise a dump bed. In addition, the housing includes winch 35 with a cable 37 which extends back to connection 29 on the bed 25 which is to be loaded.

Therefore, to load the bed 25 with the bed already elevated by props 56, the truck can back up to the bed as seen in FIG. 1. The winch cable 37 is connected to cable connection 29 on the bed. Since the winch 35 is spaced back from the front 24 of the rails, it is necessary to space the connection 29 back from the front 24 of the bed 25. The bed is pulled upon the rails 20.

The rails have skirt flange 38 on the outer edge of each of rails 20. The bed has channels 40 extending along the bottom which ride upon slide plates 39 on the rails 20. The skirt 38 will guide the channels 40 as they are riding on the rails to hold them in proper position.

As seen in FIG. 2, the channels 40 will have their webs 42 outward and channel flanges 44 inward. A ledge 46 is attached to the leg panel 30. Nose plug 31 on the front of channel 40 slides under the ledge 46; and therefore, retains the front of the bed in position. Each ledge 46 is reinforced by triangles 47 welded to the leg panel 30.

The nose plug 31 is a square tube with its forward element turned up as seen in FIG. 5. To attach the nose plug 31 on the channel 40, first the plug 31 is welded to plate 33. The plate 33 is then welded to the web 42 of the channel 40.

The rear of the dump bed is anchored in position by a pin extending through hole 48 in the rear of the skirt 38 and through a corresponding hole 48 in the web 42 of the channel 40. With this pin in place it may be seen that the back of the bed is locked to the rail. That is, it is held from moving up, forward, or backwards. The skirt 38 holds the channel 40 into position, as well as guides it.

Figure 7:
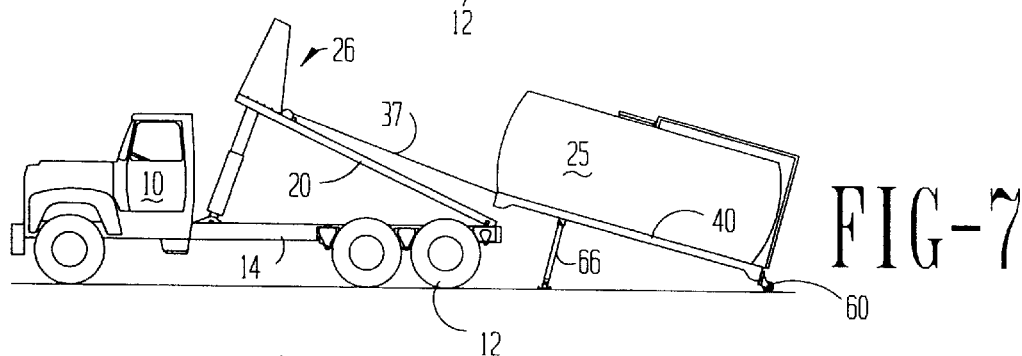
FIG. 7 is a side elevation view of a tank bed ready to be pulled onto the rails according to this invention.
Figure 8:
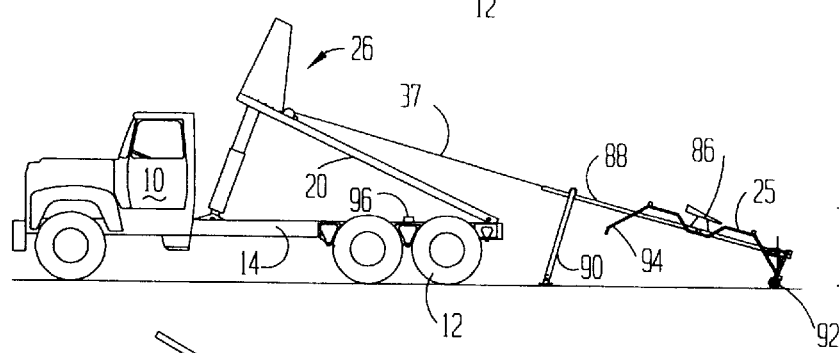
FIG. 8 is a side elevational fifth wheel bed ready to be pulled onto rails according to this invention.

Those having ordinary skill in the art will understand that any type of bed, i.e. a liquid container (FIG. 7) for hauling water or other liquids, a high pressure tank such a propane tank or butane tank, a van type bed, a flat bed, or a fifth-wheel (FIG. 8) could be mounted upon corresponding channels 40.

The housing 26 has a front bottom cover 52. The housing has top 54 to which the lifting rod 36 is connected.

Therefore, the invention provides that a single truck frame may be used to be used for many types of beds.

More particularly referring to FIG. 1 is a bed 25 is to be loaded upon the rails 20. The cable 37 from winch 35 would be attached to the connection 29. The bed itself will be elevated at its front by prop 56 which extends from tube 58. The rear of the bed 25 will rest upon a pair rollers 60. The front of the bed will be higher than the frame height h.

As the cable 37 is wound upon the winch 35 will cause the truck to roll rearward until the front of the bed contacts the slide plate 39 on top of the rails 20. At that point (or slightly thereafter) as the weight is removed from the props the props will be withdrawn by moving them upward into the tubes 58.

It will be understood at this time that the weight of the bed will be resting at its front upon the nose plug 31 and at the rear on the rollers 60. With the continued operation of the winch 35 the bed will be pulled upward upon the rails 20. It will be noted that the incline of the rails 20 is greater than the incline of the channels 40. However as the bed is pulled onto the rails there will come a time when the it channels 40 will contact the rails 20 along a large portion of the length of the bed. At this point the rails should began to be lowered thus returning the rails 20 to a horizontal position. The lowering of the rails will be done as the winch continues to pull the bed onto the rails.

The winch will pull the bed until the nose plug 31 comes under the ledge 26 to be securely in place at that point. At that time the pin will be placed into the holes 48, holding the rear of the bed securely onto the rails.

The rollers permit the back of the bed to move forward easily during the loading process. Also they prevent the rear of the bed to be in the dirt. Although in some cases it might be desirable to have the rollers removed normally to have them permanently attached is preferred. Attaching the rollers and brackets to the back of the truck be well within the skill of the art.

The most convenient way to mount the props on some beds is within vertical tubes extending along the sides of the bed. However when using beds such as a tank bed such an approach is not feasible. In this instance the preferred form is to attach horizontal tubes 62 across the channels 40. It is preferred to use 3 inch square tubes. A top horizontal element 64 made of 2½ inch square tubing can be moved into the 3 inch tube 62. Then a downward leg or prop 66 is attached to the horizontal element 64. When the bed is not supported by the prop, the prop 66 is easily removed from the square tubing and set aside.

Figure 10:
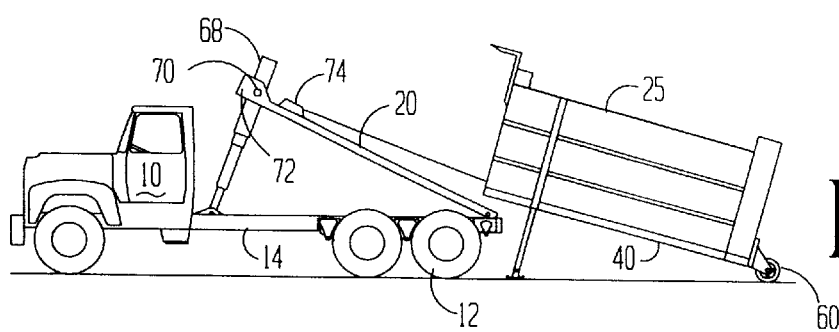
FIG. 10 is a side elevational view of a truck and dump bed showing yet another structure for raising the rails on a truck frame.

FIG. 10 illustrates an alternate structure and method for raising the rails 20. In this instance an inverted multiple unit cylinder has an exterior cylinder 68. Trunnion 70 on the cylinder 68 extends through brackets 72 at the front of the rails. A ledge will be provided within a forward low housing 74 which also houses the winch 35.

Figure 9:
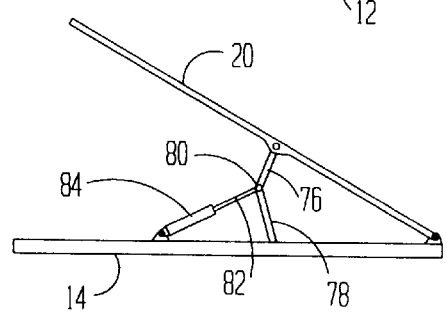
FIG. 9 is a schematic of another structure for raising the rails on a truck frame.

FIG. 9 shows yet another method of raising the rails 20 from the frame 14. In this example upper link 76 is pivoted to the rails 20. Lower link 78 is pivoted to the frame 14. The two links are connected together at the pivot 80. A rod 82 from a hydraulic cylinder 84 will move the center pivot 80. It will be seen from FIG. 9 that as the rod 82 is retracted the rails will be lowered but as the rod 82 extended the rails 20 will be elevated.

A fifth wheel 86 may be mounted upon a special fifth wheel bed 88. The bed 88 is supported side supports such as the channels 40. They will be attached together and provisions made for a prop 90 to elevate the forward end and the rollers 92 to support the rear. normally the mud guards or fenders 94 will be provided. A fifth wheel receptacle 96 will be provided upon the truck frame 14. The fifth wheel bed 88 will be attached as before. In the use of the fifth wheel an additional lock between the truck frame and the fifth wheel bed will be required on each of them in alignment with the fifth wheel axis. Such locks or connections would be known to those with skill in the art.

With the installation of the fifth wheel bed the unit would be changed from a truck rig to a tractor and trailer rig.

The embodiments shown and described above are only exemplary. We do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to point out the advantages and the progressive contribution to the trucking arts and to enable one skilled in the art to make and use the invention. The limits of the invention and the bounds of the patent protection are measured by and defined in the following claims.

I claim as my invention:

1. A structure comprising a bed having a front half and a back half adapted to be attached to a truck frame comprising:
   a) a pair of channels on each side of the bed extending the length of the bed,
   b) each channel having flanges and a web with the web of each channel outboard and the flanges of each channel inboard,
   c) a prop placed on the bed under the front half of the bed, so that the front of the bed is elevated to an incline,
   d) rollers attached to the back of the bed to roll along the ground when the bed is pulled forward.

2. The product as described in claim 1 further comprising: a connection on the front of the bed to pull the bed.

3. A structure of a truck frame comprising:
   a) a rail extending along each of two sides of the frame,
   b) the rails parallel and connected together at a rail width,
   c) each rail having a front and a rear,
   d) the rear of the rails pivoted to the rear of the frame,
   e) means on the frame for raising the front of the rails,
   f) a skirt on an outer edge of each rail,
   g) a ledge structurally connected to a front of each rail above the rail,
   h) a bed on said frame,
   I) channels having a web on the bed,
   j) said channels contacting said rails,
   k) each web against an adjacent skirt, and
   l) a part of each channel under said ledge.

4. The structure of said truck frame as defined in claim 3 further comprising:
   m) a lock rails to fix the channels to the rails.

5. A method of mounting a bed on a truck frame which has a frame height and a frame rear; comprising the following steps:
   a) propping a front of a bed on the ground to at least the frame height of the truck at a bed incline,
   b) pivoting rails to the frame rear,
   c) raising the rails to an incline which is greater than the propped bed incline, then
   d) begin pulling the bed up the raised rails,
   e) removing props used for propping the bed at the step of begin pulling the bed,
   f) rolling the bed on the ground by rollers on a rear of the bed while pulling the bed,
   g) complete pulling the bed up the rails,
   h) lowering the rails, and
   I) fastening the bed to the rails.

* * * * *